Sept. 2, 1947.  G. W. PONTIUS, 3D., ET AL  2,426,744
AUTOMATIC GUN COMPENSATOR
Filed Jan. 23, 1942  8 Sheets-Sheet 1

INVENTORS
GEORGE W. PONTIUS III
BY ARTHUR P. WILSON
ATTORNEY

Sept. 2, 1947.   G. W. PONTIUS, 3D., ET AL   2,426,744
AUTOMATIC GUN COMPENSATOR
Filed Jan. 23, 1942   8 Sheets-Sheet 6

INVENTORS
GEORGE W. PONTIUS III
BY ARTHUR P. WILSON
ATTORNEY

Patented Sept. 2, 1947

2,426,744

UNITED STATES PATENT OFFICE 2,426,744

AUTOMATIC GUN COMPENSATOR

George W. Pontius, III, and Arthur P. Wilson, South Bend, Ind., assignors to Bendix Aviation Corporation, South Bend, Ind., a corporation of Delaware Application January 23, 1942, Serial No. 427,904

8 Claims. (Cl. 89—37.5)

This invention relates to improvements in devices for the control of ordnance, and more particularly to the application thereof to military vehicles such as aircraft.

Armament for airplanes includes (a) guns which are freely movable in traverse and elevation relative to the plane upon which they are mounted, and (b) guns which are fixedly mounted in the wings or elsewhere upon the plane, and which therefore can be aimed only by aiming the plane.

The present invention relates generally to the latter type, but contemplates the provision of means for effecting a limited degree of movement of the gun in elevation to correct for varying angles of attack and range, as will be explained more fully hereinafter.

In military aircraft having fixedly mounted guns there are two problems in connection with their correct aim and fire to be considered. One is the problem of ever-changing angles of attack in flight, which is defined in this specification as the angle between the line of flight and a longitudinal axis through the fuselage of an airplane. At extremely high speeds the longitudinal axis may be inclined downwardly from the line of flight, and at other speeds may be inclined upwardly. Unless the guns are changed in response to this changing angle, it is obvious that they will fire at a point not corresponding to the target even when the airplane is aimed directly at the target.

The second problem is that of changing range of a target. Assuming that the guns can be adjusted to be parallel to the line of flight, upon firing of the guns the projectiles would not hit the target because their trajectory would cause them to fall upon a point below the target since gravity pull would be on the projectiles while in flight.

Now if the pilot raises the nose of his plane to take care of the problems above enumerated he soon thereafter loses sight of his target because the airplane begins to climb. This invention is a solution to both these problems and in an airplane equipped with a device incorporating this invention, the guns are automatically adjusted for the changes in angles of attack and changes in range of a target.

It is therefore an object of this invention to provide means for correcting the elevation of guns for different attitudes of the plane and for different ranges of the target.

Another object of this invention is to provide a novel device for determining the range and making the determined range correction on the gun, so that the gun can be moved to the proper elevation for the correct angle of fire.

Yet another object is the provision of a novel construction which will automatically correct the position of the guns for variations in the angle of attack of the plane.

Yet another object is to provide a unique follow-up mechanism for use with a device for determining angle of attack which will be operable also to aid in determining the angle of elevation for guns for whatever range they are to be fired.

Still another object embraces the provision of a novel sighting device to be used as a part of this invention for automatically correcting the guns for different firing ranges.

Yet another object comprehends a construction which will provide an index or the like for a gunner or pilot which will enable him to obtain a range setting or elevation for all possible combinations of size and range of enemy aircraft.

Another object includes the provision of an automatic cutout construction which will render the guns inoperative when the sight is not in use, in order to prevent unnecessary expenditure of electric power, an important consideration in modern military aircraft, when so many accessories are dependent upon power from a battery for operation.

Yet another object is the provision of an arrangement which will correct the sight to the line of flight, so that at all times the line of sight is parallel to the line of flight.

Still another object is to provide a construction making the automatic control inoperable, and returning the ordnance pieces to a fixed predetermined position, when the automatic compensation is not wanted.

Other objects of this invention will be more clearly understood after reference to the following drawings and description in which like numbers refer to like parts throughout. It is to be distinctly understood that the following description is illustrative merely of certain forms or embodiments, and that the invention may take other alternate forms without departing from the spirit of the invention, the scope and spirit of the invention being limited only by the appended claims.

Figure 1:
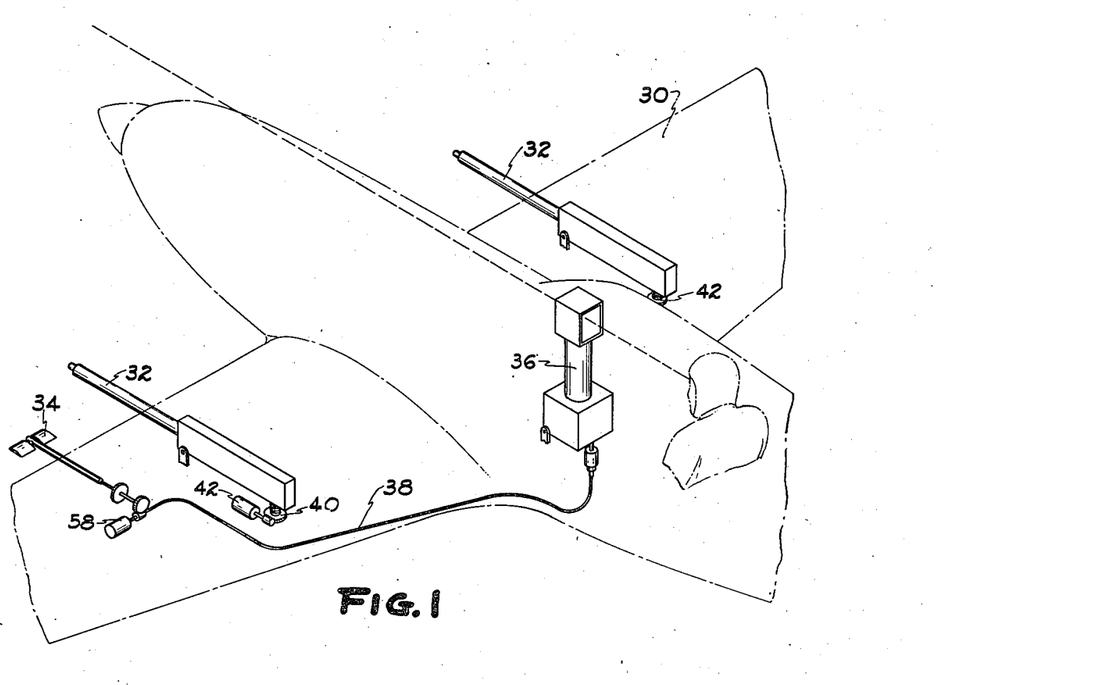
Figure 1 is a fragmentary isometric view showing a military airplane having mounted therein guns controlled and operated in accordance with the present invention.
Figure 2:
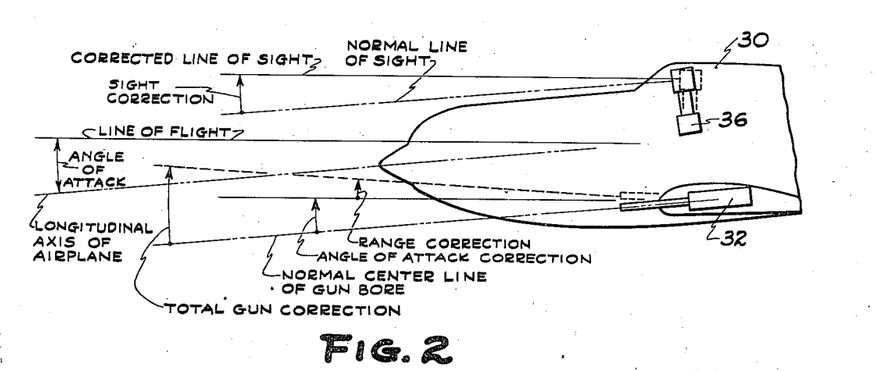
Figure 2 is a diagrammatic side view of the same.

Figures 1 and 2 show an airplane 30 in an attitude of horizontal flight. Although the line of flight in such an attitude is horizontal, the longitudinal axis of the airplane may be inclined at an angle to the said line of flight, either downwardly, as shown, or under other conditions upwardly. With guns mounted in the wings beyond the reach of a gunner, there is no possibility of changing their elevation to compensate for this flight attitude. It becomes necessary then to provide a construction, either manually or automatically operated for maintaining the guns in proper elevation.

The airplane shown in Figures 1 and 2 carries wing mounted ordnance pieces 32, which are controlled in elevation by an angle of attack vane 34.

The angles through which the guns must be moved to place them in a position for effective firing is shown in Figure 2. The total angle through which the guns are moved is composed of two angles; one, the angle of attack, which places the guns in a position corresponding to the line of flight of an aircraft; second, an angle corresponding to the range correction, which places the guns in position for effective firing with regard to a range as determined by the sight 36.

Figure 3:
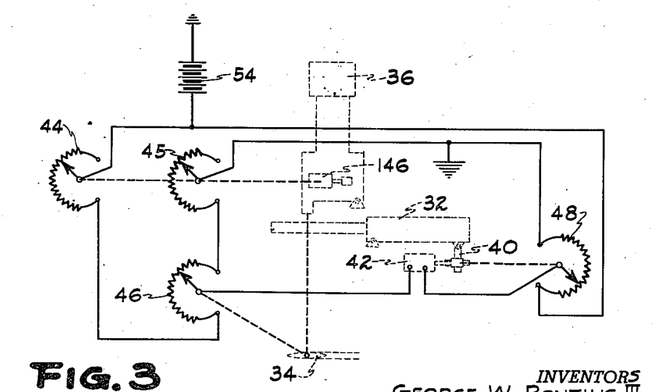
Figure 3 shows a novel type of bridge circuit for controlling the elevation of the guns.

A simplified version of the electrical circuit for operating the various units of the invention is shown in Figure 3. With reference to Figure 3, there is shown a bridge circuit composed of an angle of attack potentiometer 46, which is mechanically connected to the angle of attack vane 34 shown in Figure 1. Range variable resistors 44 and 45 are mechanically connected to, and are controlled by the sight 36 shown in Figure 1. A gun jack potentiometer 48 in the other arm of the bridge circuit is mechanically connected to the gun jack 40 shown in Figures 10 and 11. The motor 42 is placed between the two arms of the bridge circuit, comprising on the one arm variable resistors 44, 45 and potentiometer 46, and on the other arm potentiometer 48. A source of power 54 is connected through the bridge circuit shown in Figure 3 to a ground. Any unbalancing of the bridge circuit shown in Figure 3 causes a current to flow through the motor 42 which operates the gun jack 40 and which adjustable potentiometer 48 until a balance of the bridge is had, whereby equal amounts of potential difference will obtain in the two arms of the bridge circuit, so that no current flows through the motor 42.

Figure 4:
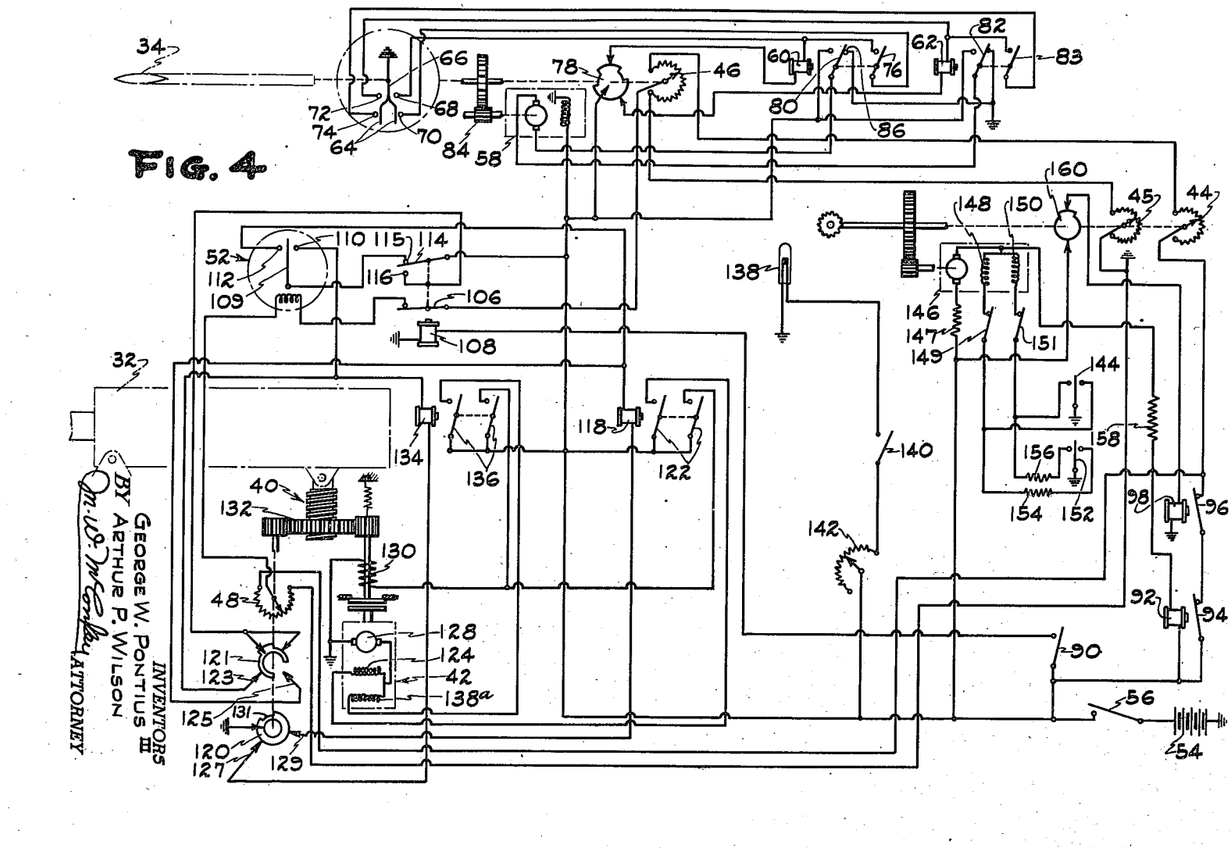
Figure 4 shows a schematic wiring diagram for compensating the gun for different angles of attack and different ranges. For simplicity, this figure shows the invention as applied to a single gun.

The complete electrical circuit is illustrated in Figure 4 where there is shown a source of power 54 connected to the circuit through a main power switch 56. The current takes a path through the field winding of a follow-up motor 58, and the flow of current through the armature windings of the follow-up motor 58 is controlled by means of relays 60 and 62, which are energized by the closing of circuits resulting from the movement of switch elements controlled by the movement of the angle of attack vane 34. The movement of the switching element 64 is accomplished through a mechanical linkage with the angle of attack vane 34. The switch 66 comprises a flexible switching element 64 which may close one of two circuits at switch contact points 68 and 70 or switch contact points 72 and 74.

Assuming that the angle of attack vane 34 has taken a position whereby contact is made between switch element 64 and the switch point 70, current will not flow in the line connecting the ground, switch element 70, and the armature 76 of the relay 60, until another contact has been made at switch point 68 of switch 66 resulting from further movement of the vane 34. When this contact is made current will flow from the source 54 through the switch 56, through a rotary limit switch 78, through the relay 60, and thence to ground at switch 66. Energization of the relay 60 will move the armatures 76 and 80 of the relay 60 thereby supplying current to the armature winding of the follow-up motor 58, since a ground is then maintained through the armature 82 of the relay 62. It will be seen then that the motor 58 will rotate in follow-up according to the displacement of the vane 34, so that the angle of attack potentiometer 46 will be adjusted according to the flight attitude of the aircraft 30. Similarily, through the medium of the flexible cable 38, the sight 36 will be adjusted so that the line of sight is parallel to the line of flight.

However, when the switch contact is broken at contact point 68 of the switch 66 because of the rotation of the follow-up motor 58 to which the switch 66 is connected mechanically, the current flowing through the armature of the motor 58 will not be cut off since another ground is still made at the armature 76 of the relay 60. The circuit when the motor is operating under this condition is through the ground at the switch 66, through the switch point 70, through the relay armature 76, and thence through the relay 60 to the source of current 54. When the follow-up motor 58, through appropriate gearing 84, has moved the switch to a position where the contact at point 70 is broken, the ground connection for the relay 60 is also thereby broken, and deenergization of the relay 60 causes the relay armature 80 to close a connection at switch point 86 of the relay 60, and the armature winding of the motor 58 is thereby deenergized.

The circuit which is responsive to the movement of the angle of attack vane includes a follow-up construction for all movements of the angle of attack vane regardless of the direction. Assuming that the angle of attack vane 34 has taken a position whereby contact is made between a switch point 74 and flexible switching element 64, current will not flow in the line connecting the ground, switch point 74, and the armature 83 of the relay 62, until another contact has been made with the switch point 72 of the switch 64, resulting from a further movement of the vane 34. When this second contact is made at switch point 72 current will flow from the source 54 through the switch 56, through the limit switch 78, through the relay 62, and thence to ground. Energization of the relay 62 will move the armatures 82 and 83 whereby a ground is made for the armature winding of the follow-up motor 58, since a ground is then maintained through the switch point 86 of armature 80. Since the flow of current through the armature of the follow-up motor 58 is thereby reversed, the direction of rotation of the armature is also reversed. The follow-up mechanism comprising the motor 58 and the gearing 84, which is connected mechanically to the angle of attack vane 34, will then move to put the system in neutral once more as described previously. The rotation of the motor 58 will break a contact at the switch point 72, but the current flowing through the armature of the motor will not be cut off since another ground is still made at the relay armature 83 and the accompanying switch point. The circuit when the motor is operating under this condition is through the ground at switch 66, through the switch point 74, through the relay armature 83, through the relay 62, and thence to the source 54. The rotation of the motor will then break the contact at switch point 74 breaking the ground of the circuit comprising the relay 62, thereby breaking the source of current to the armature of the follow-up motor 58.

The follow-up motor 58, which is responsive in its movement to the movements of the angle of attack vane 34, is connected by a flexible shaft 38 to the gun sight 36, as shown in Figure 1. The purpose of the flexible cable 38 is to provide for the correction of the sight 36 to the movements of the angle of attack vane 34. Since the angle of attack vane is responsive to the line of flight of an aircraft 30, it will, by means of the flexible cable 38, make the sight 36 responsive also to the line of flight of the aircraft 30. Appropriate gearing which will be described with reference to the details of the angle of attack vane and with reference to the details of the sight 36, will make the line of sight at all times parallel to the line of flight of the aircraft (see Figures 1 and 2).

When the follow-up motor has moved the switch 64 to the position where no contacts are made, the potentiometer 46 will have been adjusted to a position representing the condition of flight as determined by the angle of attack vane 34. The limit switch 78 is so arranged that current will not flow through the system above described when the angle of attack vane is beyond a position whereby correction can be effected. This construction provides a safety feature insuring against damage to the parts.

Thus far has been described a construction for placing a portion of an electrical circuit in a condition which will contribute to the effect of another portion of an electrical circuit, whereby automatic compensation of ordnance may be effected. That portion of the system which varies the electrical circuit for the purpose described above will next be described.

Referring again to Figure 4, switch 90 controls the flow of current to the portion of the circuit which adjusts the position of ordnance for variations in range and size of an enemy aircraft and also for variations in the angle of attack.

The switch 56, which is the main power switch for the circuit, controls the operation of part of the circuit which includes the novel sight construction forming a part of this invention. The sight includes a source of light 138, which can be cut off entirely through a manual switch 140, and which can be adjusted in its intensity by means of a manually operated rheostat 142. The sight also comprises a film driving mechanism shown schematically in this figure (Figure 4) and an optical system not shown in this figure but described below.

A construction is provided whereby the gunner or aviator can remove the effect of the angle of attack and range correction of portions of the circuit from the ordnance pieces. This construction eliminates small movements of the guns which would normally be effected by the angle of attack follow-up construction when changes in the flight attitude occur. The switch 90 is operated manually to negate the control effect of the sight and angle of attack follow-up construction whenever their operation is not wanted. When the manual switch 90 is closed, the balancing portion of the circuit shown in Figure 3 is broken, and the ordnance pieces are returned to a fixed position as determined by an index switch 121 mechanically connected to the gear drive located at the gun jack 40, the details of which operation will be explained later in this specification.

A pair of switches are operable to control the speed of film movement through the sight and also its direction. Control of the motors which drive the film in the sight is as follows. When a manually operated high speed switch 144 is closed to either one of its two switch points current will flow through the armature of a film drive motor 146, through the series winding 148 of said motor, and thence to ground. Reversal of the direction of the motor 146 is accomplished by throwing the switch 144 to the other switch point, the motor 146 having a field winding 150 of opposite direction. A buffer resistor 147 is provided between the source 54 and the armature of the motor 146 to control its starting torque. The line drop developed by the resistor 147 prevents any tendency for the motor 146 to start abruptly which might possibly do damage to the film. When the motor 146 is operating at high speed, a relay 92, disposed in the circuit which controls the movement of the gun jacks 40 is energized, thereby breaking the circuit at armature 94 of the relay 92. The breaking of this circuit prevents the movement of the machine guns when the aviator is moving the film through the sight when changing to a particular range and type of enemy aircraft.

For close adjustment of the film included in the sight a control is provided to operate the series motor 146 at low speeds. A manually operated double pole switch 152 is provided with resistors 154 and 156 for control of the current through the field windings 148 and 150. Reversal of the motor 146 is accomplished as described with reference to the operation at high speed through the switch 144.

A pair of switches 149 and 151 are automatically operable to control the current to the field windings 148 and 150 respectively. Each switch is so disposed with reference to the film strip that when the strip is nearing a position where it will be completely unwound from its reel the switch will open, thereby cutting off the current to the field winding with which it is associated. At such a time the film can be wound only in the opposite direction, since the switch associated with the other winding is still closed.

To prevent the operation of the relay 92 when the motors are operating at low speed, a resistance 158 is included in the circuit which controls the operation of the relay 92. The sum of the resistances in either resistance 154 or 156 and resistance 158 is sufficient to limit the current passing through the relay 92 to an amount which is not great enough to operate the relay armature 94. Under these conditions current can flow to the portion of the circuit which controls the position of the ordnance pieces 32.

A wafer switch 160 is operated by a mechanical arrangement connected to the film drive and serves to cut off the current to the part of the circuit which operates the ordnance pieces when the gunner or aviator is changing from one wing span of an enemy aircraft to another wing span. When the circuit is completed at the switch 160, the relay 98 is thereby energized. The relay armature 96 then breaks the circuit at that point, so that no current can flow to the part of the circuit which controls the movement of the ordnance.

When the sight has been adjusted for the proper ranges and size of an enemy aircraft the current will then take a path through the switches 56, 94, and 96 through the range variable resistor 44 to the angle of attack potentiometer 46, through said potentiometer, thence through range variable resistor 45 and thence to ground. The flow of current through this circuit is the equivalent of that shown in Figure 3, the equivalent elements therein being represented by variable resistors 44 and 45 and potentiometer 46.

When switch 90 is open the bridge circuit is completed, and if the bridge circuit is unbalanced a current will flow from the wiping arm of the angle of attack potentiometer 46 through relay armature 106 through the winding of polar relay 52 to the wiper of gun potentiometer 48, thus causing polar relay armature 109 to be closed on one of a pair of switch points 110 and 112 depending on the direction of current flow through the polar relay 52. Assuming that the armature 109 is deflected to the left in Figure 4, making a contact at switch point 112, current will then flow from the source 54 through the switch 114 at switch point 115 through the armature 109 at switch point 112 through a relay 118 and thence to ground at the switch 120. The energization of the relay 118 closes a double pole switch 122. Current may now flow from the source 54 through the switch 122, thence to a winding 124 on a series wound machine gun jack motor 42, through the armature 128 of the motor 42 and thence to ground. The closing of the double pole switch 122 also energizes a winding 130 forming a part of a magnetic clutch in connection with the motor 42. Engagement of the clutch of the motor 42 causes gearing 132 on the gun jack 40 to turn in such a manner either to elevate the guns or depress them, depending upon the direction of the field current in the motor 42.

The gearing 132 is connected mechanically to the wiping arm of the potentiometer 48 (Figure 3), and the wiping arm of the potentiometer will move to a position which will balance the bridge, thereby stopping the flow of current through the polar relay 52. The polar relay armature 109 will then occupy a neutral position between the switch points 110 and 112 and the relay 118 will then be deenergized and the switch 122 will open. The energization of the field winding 124, and the magnetic clutch winding 130 will then cease, and the gearing will be brought to an abrupt stop through the medium of a friction brake located in connection with the magnetic clutch, not shown in Figure 4.

Assuming that the flow of current through the polar relay 52 is reversed, the polar relay armature 109 will make contact at switch point 110. A relay 134 will then become energized and a double pole switch 136 will close. Current will now flow from the source 54 through both poles of the switch 136, and the magnetic clutch winding 130 will thereby be energized at the same time as the field winding 138a of the motor 42. The field winding 138a is wound in an opposite direction from that of the field winding 124 and the direction of rotation of the armature 128 is thereby reversed. Movement of the gun jack will then take place as described above and the moving arm of the potentiometer 48 will move until a balance of the circuit is had once more as described with reference to the operation of the circuit through the switch point 112.

A safety features is provided in connection with the arrangement shown in Figure 4 whereby the guns can be returned to a fixed position. The switch 90 is manually operated to make ineffective the balancing portion of the bridge circuit shown in Figure 3. Closing switch 90 energizes relay 108 moving the armatures 106 and 114 associated with the relay 108. The flow of current through the polar relay 52 is thereby cut off and the guns will not be operated in response to the unbalanced condition of the bridge circuit. The current will take a path through the main power switch 56 through the armature 114, at the switch point 116, thence to an indexing switch 121. Depending upon the position of the gun, the current will flow from switch 121 to either contact 123 or 125. Upon closing the switch at contact 123 current will flow through the relay 134 and thence to ground at the limit switch 120. The relay 134 will thereby be energized, and the double pole switch 136, associated with the relay 134, will close. The series motor field winding 138a, and the magnetic clutch winding 130 will thereby be energized, and the armature 128 will rotate to move the gun to a neutral position. Upon closing switch 121 at contact 125 current will flow to energize relay 118 which causes motor 42 to rotate in the opposite direction to return the gun to neutral. The mechanical arrangement associated with the gear drive 132, for operating the gun jack 40, will move the index switch to a position whereby switch elements 123 and 125, associated with the index switch 121, will fail to make contact. Failure of the switch elements 123 and 125 to make contact at the index switch 121 will thereby deenergize the windings 138a, 124, 130, associated with the gun jack motor and the magnetic clutch. Thus the operation of the switch 99 and the indexing switch 121 returns the guns 32 to a fixed position relative to the aircraft 30.

The limit switch 120, associated with the gearing 132, for driving the gun jack 40 is so arranged that when the guns reach a determined position the operation of the jack motor 42 will be suspended. When limit switch 120 has rotated to a position where the cutout sector 131 spans switch element 129, relay 118 will be deenergized; similarly, relay 134 will be deenergized when the cutout sector 131 spans switch element 127. The incorporation of the two switches 120 and 121 in the system shown in Figure 4 provides a double safety feature, which insures against the guns reaching a position whereby danger to any of the parts might occur.

Figures 6, 7, 8, 9:
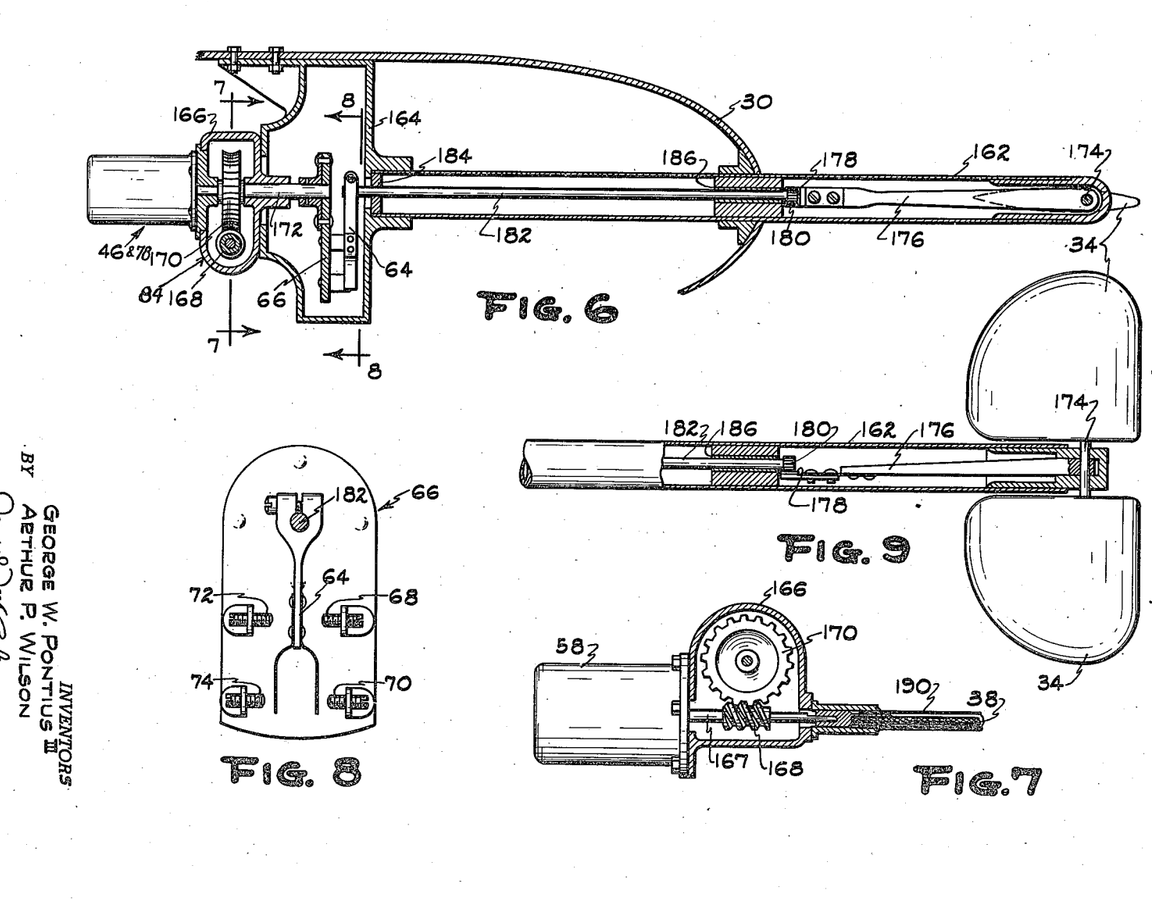
Figure 6 shows in section a vane mounted in the leading edge of the wing for correcting the guns for different angles of attack.
Figure 7 is a sectional view taken along the line 7—7 of Figure 6.
Figure 8 is a view taken along the line 8—8 of Figure 6 showing a novel switching arrangement mounted in the vane.
Figure 9 is a plan view of the vane shown in Figure 6 certain parts being in plan section to show the detail of a rack and pinion arrangement for operating the switch shown in Figure 8.

The detailed description of the angle of attack vane will be had with reference to Figures 6, 7, 8 and 9. In Figure 6 is shown in section a portion of the leading edge of the wing 30 of the airplane shown in Figure 1, having mounted therein the angle of attack vane 34 enclosed in a housing 162. The interior end of the housing 162 is rigidly connected to a switch-enclosing housing 164 which is attached to the airplane wing 30. Connected to the housing 164 is a gear case 166 containing a worm 168 and a worm-wheel 170 which is driven by the follow-up motor 58 described in Figure 4 and shown in Figure 7. The adjustable angle of attack potentiometer 46 is shown mounted adjacent the gear casing 166. A shaft 172 connects potentiometer 46, the worm-wheel 170, and the follow-up portion of the switch 66. The follow-up portion of the switch 66 carries the switch points 68, 70, 72 and 74, described in Figure 4, and shown also in Figure 8.

The angle of attack vane 34 is attached to a pivot 174 which carries an arm 176 having a rack 178 which engages a pinion 180 mounted at the end of the shaft 182 located within the housing 162. Suitable bearings 184 and 186 mounted in the housing 162 support the shaft 182, the other end of which is connected to the switch element 64.

With reference to Figure 7 there is shown the follow-up motor 58 which is secured to the gear casing 166. The follow-up motor 58 drives a shaft 167 carrying the worm 168 which drives the worm-wheel 170. Attached to the shaft 167 is a flexible shaft 38 which turns in a sheath 190. The flexible shaft is connected at its other end to a speed reducer unit shown in Figures 12 and 15.

Figures 12, 16:
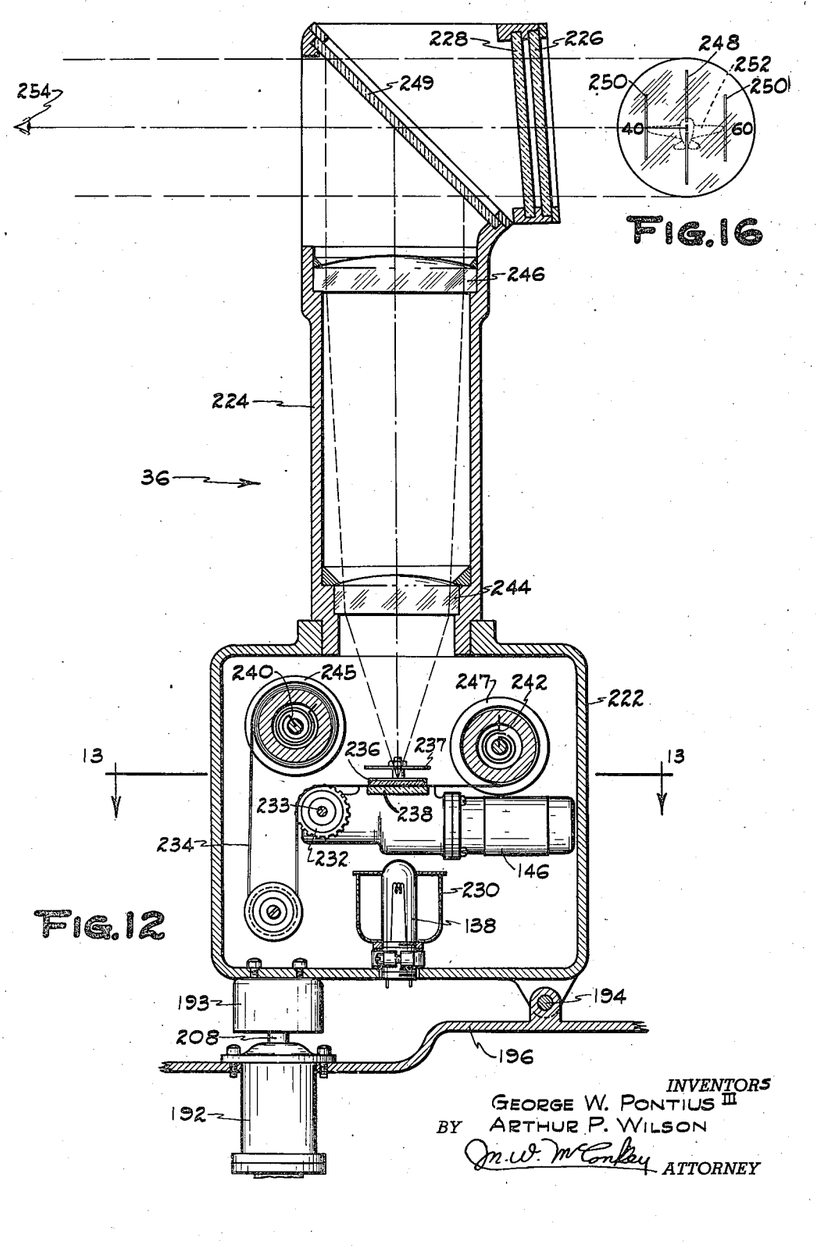
Figure 12 shows the novel sight arrangement forming a part of this invention.
Figure 16 shows the image of an enemy aircraft positioned in the sight.
Figures 14, 15:
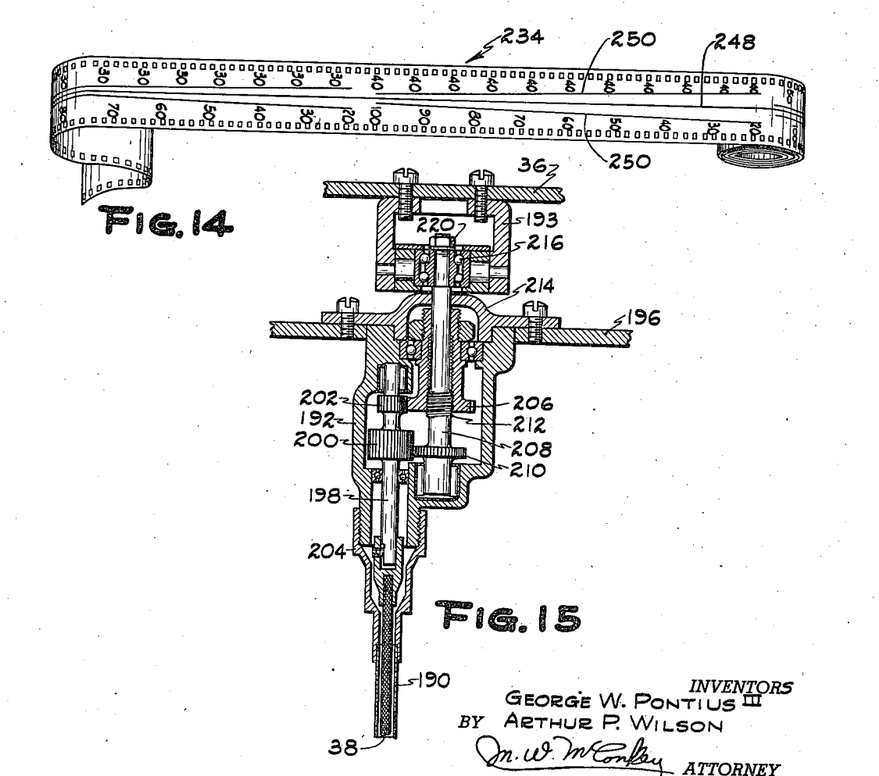
Figure 14 shows a portion of the film or tape of suitable material used in the sight shown in Figure 12 for determining the range and elevation.
Figure 15 is a sectional view of a speed reducing arrangement for making the line of sight parallel to the line of flight as determined by the angle of attack vane.

In Figures 12 and 15 there is shown a speed reducer which is contained in a housing 192, rigidly secured to a portion 196 of the aircraft structure. The driven end of the speed reducer is contained in a cup-shaped member 193 which is bolted to the sight 36, pivotally mounted at 194 to the portion 196 of the aircraft structure.

The speed reducer end of the flexible shaft 38 is attached to a driving shaft 198, containing gears 200 and 202, which turns in suitable bearings located within the housing 192. One end of the shaft 198 and the end of the flexible shaft 38 is enclosed by a nipple 204 threaded to the housing 192. The gear 202 drives a gear 206 which rotates in a suitable bearing mounted in the housing 192, and which has an internally threaded portion. A shaft 208 has a gear 210 mounted on it, and a threaded portion 212 which is engaged by the internally threaded portion of the gear 206, and which is mounted in bearings located in the housing 192. A cover plate 214, secured to the aircraft structure 196, encloses one end of the housing 192, and is attached to the housing by any suitable means. The protruding portion of the shaft 208 has a suitable bearing 216 mounted near its end. The bearing is secured against axial movement on the shaft 208 by a nut 220 threaded to the end of the shaft 208, and is pivotally mounted in any suitable manner in the member 193.

The operation of the speed reducer shown in Figure 15 is as follows. Since gear 200 is larger in diameter than gear 202 the speed of rotation of gear 206 will be less than that of gear 210. The difference in relative rotation of these two gears will thereby cause the shaft 208 to move axially with respect to the housing 192, depending upon the direction of rotation of the shaft 198. It will be apparent that the axial movement of the shaft 208 will effect a rotative movement on the sight 36, shown in Figure 12, since it is pivoted at 194. Selection of the proper gearing shown in Figure 15 will cause the sight 36 to be rotated through such an angle that the line of sight will at all times be parallel to the line of flight of the aircraft.

The sight which has been described with reference to Figure 4, will now be described in detail with reference to Figures 12, 13, 14, and 16. The sight 36 comprises a casing 222 which is pivoted at 194, and which is made to rotate by the axial movement of the shaft 208, the outer end of which is fixed in a housing 193 as previously described. An L-shaped tube 224 is secured to an opening in the casing 222, and polarizing media 226 and 228 serve to limit the ingress of light to the tube 224. The amount of light which can enter the tube 224 is varied by rotation of one of the polarizing media with respect to the other.

The casing 222 has within it a light source 138 which is suitably prevented from emitting stray light by a shield 230. A film drive motor 146 is suitably mounted in the casing 222 and drives a sprocket 232 mounted on a shaft 233, by gearing not shown, to effect the movement of a film 234 between a screen 236 and a ground glass guide plate 238. Proper tension is maintained on the film at all times by helical springs 240 and 242 located respectively in film reels 245 and 247.

Disposed in the tube 224 are a pair of collimating lenses 244 and 246. A substantially transparent glass screen 249 is disposed at an angle of 45° to the line of sight of the aircraft 30, and also at 45° to the beam of light transmitted by the light source 138, which passes through the film 234 at the screen 236 and through the collimating lenses 244 and 246.

The film 234 is shown in detail in Figure 14 but actually is opposite to the black and white relationship shown. In other words, the body of the film is opaque, and the lines and figures thereon are substantially transparent. The numbers near the upper edge of the film strip 234 and adjacent the sprocket drive holes, represent the wing span of an enemy aircraft as measured in feet. The numbers near the lower edge of the film strip 234, and adjacent the sprocket drive holes, represent the range of an enemy aircraft in hundreds of yards. The film strip 234 is shown with a center line 248 and a pair of diverging lines 250 located symmetrically with respect to the center line 248, disposed one on each side of the center line 248.

Figure 13:
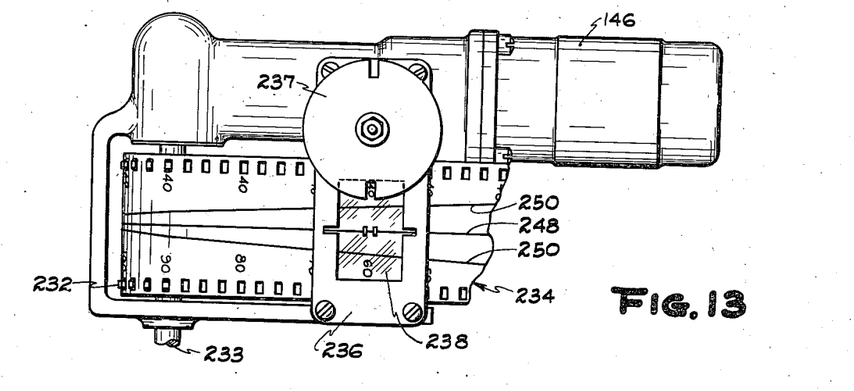
Figure 13 is a plan view taken along the line 13—13 of Figure 12.

Figure 13 shows the plan view of the screen 236 which is made of a transparent material such as glass, the shaded parts in this view representing the opaque portions of the screen. The screen 236 is so patterned that a relatively long portion, with respect to the diverging lines 250, of the image of the center-line 248 is cast upon the glass screen 249, and is broken by the two opaque portions at the center of the screen 236.

A shutter 237 is provided in the path of the light rays coming through the screen 236 to prevent blurring of the figures representing the wing span of an enemy aircraft when they move past the screen 236. By appropriate gearing (not shown) a slot in the shutter 237 is made to coincide with the figures representing the wing span, so that they appear stationary to the operator.

A shaft 233 upon which the film sprocket drive is mounted, drives the range variable resistors 44 and 45, not shown in Figures 12 and 13, which make one complete revolution during the movement of one set of diverging span lines past the screen 236 and the guide 238.

In Figure 16 is shown the image of an enemy aircraft 252 positioned between the sight lines 250 shown in Figure 14. The aviator has selected the portion of the film properly applicable to a size of wing span shown in feet at the left of the image shown in Figure 16. At the right is shown the range in hundreds of yards along the sight line 250.

The operation of the system shown in Figures 12, 13, 14 and 16 is as follows. The light rays from the source 138 pass through the ground glass guide plate 238, through the transparent portions of the film 234 and the screen 236, through the collimating lenses 244 and 246, and are reflected from the glass screen 249 to the eyes of an aviator or gunner 254. The gunner places the center line of the enemy aircraft 252 in superimposition with the center line 248 of the film strip 234. He then effects movement of the film strip through the guide 238 by closing either switch 144 or switch 152, shown in Figure 4, to the position of the film which has a wing span marking corresponding to the wing span of the enemy aircraft 252. By varying the speed and direction of the film by means of switches 144 and 152 he is able to keep the image of the enemy aircraft located at all times within the range lines 250 shown in Figure 16.

It will be seen that the movement of the film strip 234 in the sight 36 varies the setting of the variable resistors 44 and 45, and that when the stadia lines 250 are spanning the target image, there is created an unbalance of the bridge circuit to pass current through the polar relay 52 to move the guns 32 until, by means of gun potentiometer 48, the bridge is again balanced. When the condition of balance of the bridge is had, the guns 32 are properly trained on the target for a particular flight attitude of airplane 30, for a particular size target, and for a particular range of target.

Figure 10:
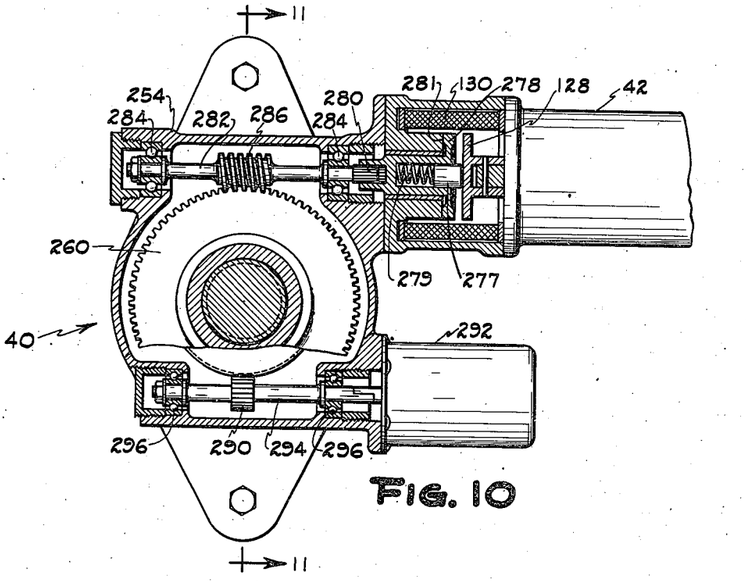
Figure 10 shows in plan certain elements of the jack and operating motor for elevating and depressing the guns, certain parts thereof being either shown in section or cut away.
Figure 11:
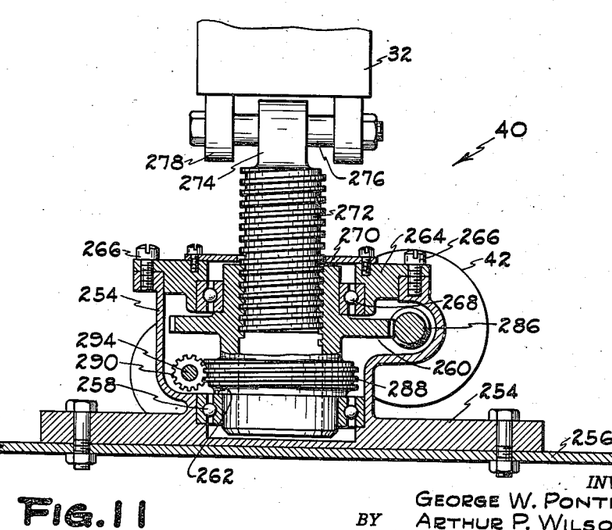
Figure 11 is a section taken along the lines 11—11 of Figure 10.

In Figures 10 and 11 there is shown the detailed construction of the gun jack referred to in the description had with reference to Figure 4. The gun jack 40 comprises a casing 254 which is secured to a portion 256 of the aircraft structure. Located within the casing 254, and near its base, is a bearing 258 for receiving the end of a jack worm-wheel 260. The bearing 258 is disposed between a shoulder in the casing 254 and a shoulder 262 on the worm-wheel 260. The casing 254 is closed partly at its upper extremity by a plate 264 having a flange which protrudes into the casing, and is secured to the casing 254 by cap bolts 266. In the recess between the worm-wheel 260 and the flange portion of the cover plate 264 is positioned a bearing 268, and shoulders located on the worm-wheel 260 and the flange portion of the cover plate 264 prevent the axial movement of both bearings 268 and the worm-wheel 260. A small circular plate 270 is secured to the cover plate 264 and closes the circular opening between the cover plate 264 and the drive worm-wheel 260.

The worm-wheel 260 has an interior threaded surface which is engaged by a square cut screw 272. The end of the screw 272 is formed into an eye 274 through which a pin 276 is passed, and which pin is also passed through eyes 278 disposed at the end of an ordnance piece 32. The worm-wheel 260 is driven by the gun jack motor 42 through a magnetic clutch comprising a winding 130. The control of the operation of the motor 42, and of the clutch has been described previously with reference to Figure 4. When the motor 42 is operated, the winding 130 is at the same time energized. The movement of the driven member 278 to the right in Figure 10 is opposed by a spring biased element 277 and spring 279. Deenergization of the winding 130 causes the driven portion 278 to act as a brake, since when it is urged to the left, it will be frictionally engaged by a surface 281 in the housing of the motor 42. Energization of the winding 130 causes a driven portion 278 to be pulled to the right, where it is engaged by the driving end of the armature 128 of the motor 42. The driven member 278 is slidably mounted on a splined portion 280 of a driving shaft 282 which is rotatably mounted at each end in suitable bearings 284 located in the casing 254. The driving shaft 282 has a worm 286 mounted thereon, which drives the worm-wheel 260.

The worm-wheel 260 has an externally threaded portion 288 which engages by a spur 290, mechanically connected to the gun potentiometer 48, the index switch 121, and the limit switch 120, which have been described with reference to Figure 4, by a shaft 294 mounted in bearings 296 located in the casing 254, and which are contained in a suitable housing 292.

The operation of the arrangement shown in Figures 10 and 11 is as follows. When the motor 42 is operated the clutch will engage the armature 128 since winding 130 will be energized. The turning of the armature 128 of motor 42 drives the worm 286 which effects rotation of the worm-wheel 260. Rotation of the worm-wheel 260 causes rotation of the spur 290 which is engaged by the externally threaded portion 288 of the worm-wheel 260. The system will remain operable until the spur 290 and its associated shaft 294 changes the position of the gun potentiometer, index switch 121, and limit switch 120 until the bridge circuit will be balanced, or until the index switch 121 makes the guns immovable when the bridge circuit is made inoperable.

Figure 5:
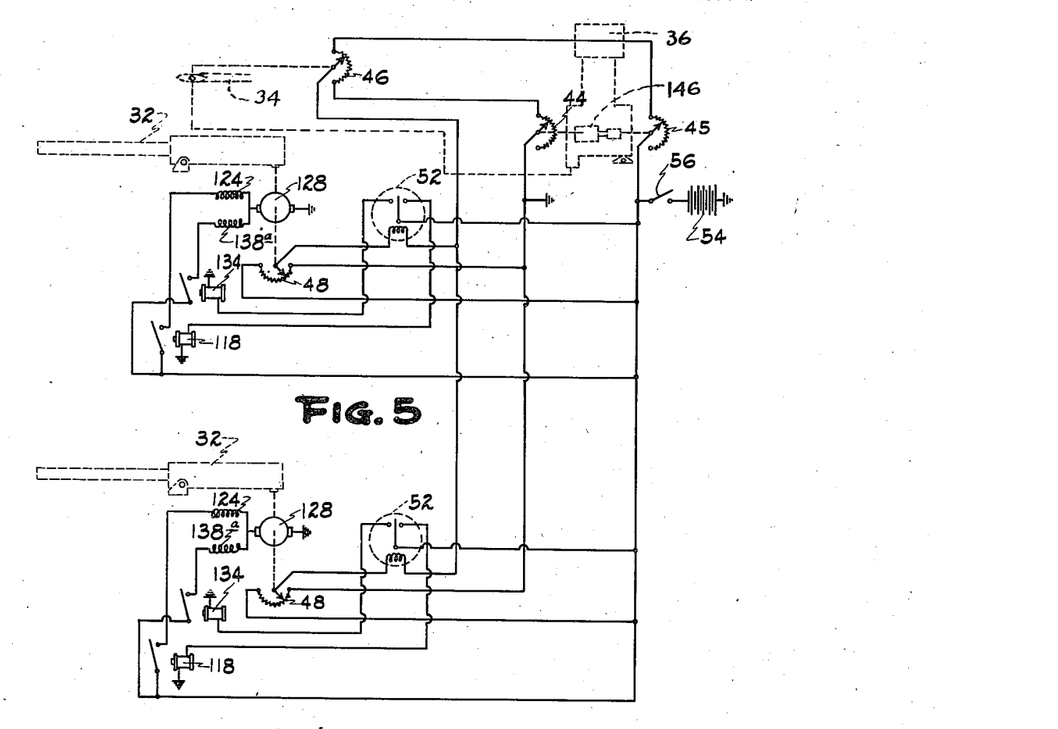
Figure 5 shows schematically the invention as applied to a plurality of guns.

With reference to Figure 5 there is shown the system as outlined above in connection with a plurality of ordnance pieces. In the figure the reference numerals refer to equivalent parts as described with reference to the foregoing description. In the system shown in Figure 5 it will be seen that one angle of attack vane 34 will contribute to the control of the system, and that one sight 36 and the range variable resistors 44 and 45 included therein will contribute to the control of the guns. However, the balancing of the circuit is effected by incorporating a separate polar relay and separate gun potentiometers associated with each ordnance piece. The operation of the system shown in Figure 5 is identical with that described with reference to the foregoing descriptions.

Figure 5A:
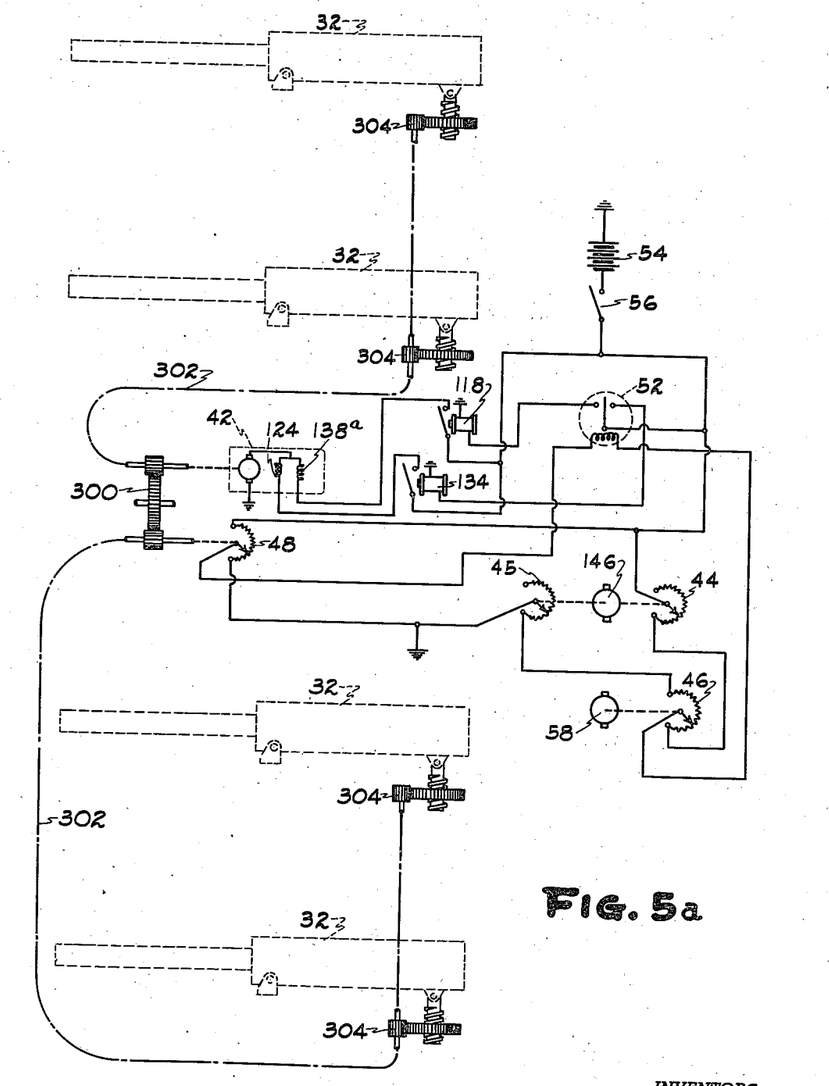
Figure 5a shows the invention as applied to a plurality of guns driven by a single jack motor through a mechanical linkage.

In Figure 5a there is shown a system in which a single motor 42 is used for driving the gun jacks. The gun jack motor 42, which has been described with reference to a single ordnance piece, as shown in Figure 4, now effects the drive of all of the ordnance pieces through a set of gears 300. A flexible shaft 302 connects the gear train 300 and a driving gear 304 associated with each gun jack.

It will be seen that this construction makes unnecessary a motor associated with each gun jack, a single motor 42 in the control circuit as described with reference to Figure 4, effecting the control of a plurality of ordnance pieces. This construction makes necessary the use of only one polar relay 52 and only one gun potentiometer 48. It will be seen also that the field control relays 118 and 134 will be associated only with the master control motor 42, making unnecessary their use in connection with each gun.

The operation of the invention is as follows.

When the pilot of the airplane 30 wishes to have automatic compensation of the guns 32 for both range and angle of attack, he closes power switch 56 which passes current to the field of the follow-up motor 58 of the angle of attack vane 34. Assuming now that the vane 34, which adjusts itself according to the line of flight of the airplane 30, closes switch 66 at contact points 68 and 70, current will then flow through the rotary limit switch 78, through the relay 60 and thence to ground at the switch 66. When the relay is energized, relay armatures 76 and 80 will close to supply current to the armature of follow-up motor 58 to open switch 66, and stop motor 58. The angle of attack potentiometer 46 will then be adjusted according to the position of the angle of attack vane 34, and the sight 36 will be rotated slightly, by means of flexible shaft 38, so that the line of sight is parallel to the line of flight.

The pilot meanwhile has sighted on an enemy target plane, and knowing the wing span of the enemy target plane, he adjusts the movable film strip 234 until the stadia lines 250 are tangent to the wings of the target image 252 as seen in the sight 36. The movement of the field strip 234 at the same time adjusts the range variable resistors 44 and 45 to a position corresponding to the corrected range.

The portion of the bridge circuit embracing the angle of attack potentiometer 46 and the range variable resistors 44 and 45 will cause a potential difference between the wiper arm of angle of attack potentiometer 46 and gun potentiometer 48 to actuate the polar relay 52, which determines the movement of gun jack motor 42. The guns 32 will then move in follow-up as determined by the condition of angle of attack potentiometer 46 and range variable resistors 44 and 45. As the guns are moved in follow-up, the gun potentiometer 48 will be adjusted to a position where no potential difference will obtain to actuate polar relay 52 thus cutting the current to the gun jack motor 42, at which time the guns 32 will be adjusted for both range and angle of attack, whereby they are correctly trained on any enemy target.

Thus there has been described a construction for automatically compensating ordnance for all attitudes of the vehicle wherein they may be mounted, and for all conditions of range in which they may be fired. There has also been described a novel construction which includes the use of safety devices so that danger to the parts thereof will not be experienced when an aircraft assumes a flight attitude which will not permit of compensation of the ordnance.

The constructions described are desirable embodiments of invention, but it is not to be construed that the invention is limited to the embodiment shown, the limitations being only according to the terms of the claims which are here appended.

What is claimed is:

1. The combination with a gun mounted on an aircraft, of means including an air vane mounted on the aircraft and arranged to follow the line of flight of the aircraft, sighting means mounted on said aircraft for viewing a target and including means for determining the range of the target, means mounted on said aircraft and drivably connected to said gun and sight for elevating and depressing said gun and sight relative to the aircraft, and means controlled by said first-named means and the means for determining the range of the target for compensating the gun for range and angle of attack.

2. Apparatus for controlling a gun mounted on an aircraft, comprising means mounted on the aircraft and operatively connected to the gun for elevating and depressing said gun relative to the aircraft to compensate for angle of attack of said aircraft, control circuits for said means, and means mounted on said aircraft and disposed in the air stream to follow the line of flight of the aircraft, said control circuits including means responsive to said last-named means for connecting said control circuits to said first-named means to elevate or depress said gun.

3. Apparatus for controlling ordnance mounted on an aircraft, comprising a gun mounted on the aircraft for movement in elevation and depression relative to the aircraft, a sight for said gun constructed and arranged for movement in elevation and depression relative to said aircraft and to said gun, means drivably connected to the gun for elevating and depressing the same, means mounted on the aircraft and having a member disposed in the air stream to follow the line of flight of said aircraft, a motor operative in response to said member as it follows the line of flight of said aircraft, control circuits connected to said first-named means and to said motor, means connecting said motor to said sight for moving the sight to compensate for the angle of attack of the aircraft, and means in said control circuits responsive to rotation of said motor for creating an unbalanced condition in said circuits to cause said first-named means to elevate or depress said gun.

4. The combination with a gun and sighting means therefor mounted on an aircraft, of means including an air vane mounted on the aircraft and projecting into the air stream to follow the line of flight of the aircraft, means including a reversible motor operatively connected to said sighting means and responsive to movement of the vane for controlling the position of said sight in elevation and depression relative to the aircraft, and means including a reversible motor operatively connected to said gun and responsive to rotation of said first-named motor for controlling the position of the gun in elevation and depression to compensate for angle of attack.

5. A mechanism for controlling the elevation of a gun with respect to an aircraft on which the gun is mounted, to compensate for the angle of attack of the aircraft, so that the gun will be parallel to the line of flight of the aircraft, comprising an element projecting into the wind stream and constructed and arranged to move to a position corresponding to the line of flight of said aircraft as the angle of attack varies, an electrical system for controlling the elevation of the gun to compensate for angle of attack and including a device drivably connected to said gun, and means in said system responsive to movement of said element for energizing said system to operate said device.

6. A mechanism for elevating and depressing a gun with respect to an aircraft on which the gun is mounted to compensate for the angle of attack of the aircraft, so that the gun will be parallel to the line of flight of the aircraft, comprising an element projecting into the wind stream and constructed and arranged to move to a position corresponding to the line of flight of said aircraft, an electrical system for controlling said gun and including a follow-up motor and a potentiometer controlled in its movement by said motor so as to introduce an unbalanced condition into said system to cause a change in elevation of said gun, and means in said system responsive to the change in position of the element as the angle of attack changes for connecting said system to the gun and responsive to the follow-up motor for disconnecting said system from the gun.

7. A mechanism for controlling the elevation of a gun with respect to an aircraft on which the gun is mounted, to compensate for the angle of attack of the aircraft, so that the gun bore will be parallel to the line of flight of the aircraft, comprising an element projecting into the wind stream and constructed and arranged to adjust itself to a position corresponding to the line of flight of the aircraft, an electrical system for controlling said gun and including a follow-up motor and a potentiometer controlled in its movement by said motor for introducing an unbalanced condition into said system for causing a change in elevation of said gun, and means in said system having one member responsive to the change in position of the element, as the angle of attack of said aircraft changes, and a second member responsive to rotation of the follow-up motor and constructed and arranged to be engaged by said first member, so that movement of said members respectively connect and disconnect said electrical system to and from said gun, for changing its elevation.

8. A mechanism for changing the position of a gun in elevation relative to an aircraft on which the gun is mounted, comprising an electrical control system having means therein for connecting the system to the gun at times when a change in the elevation of the gun is desired and for disconnecting the system from the gun when the gun has been moved to a predetermined position in elevation, a vane projecting into the wind stream and constructed and arranged to follow the line of flight of the aircraft and operatively connected to said means to connect the system to the gun, a follow-up motor in said system operatively connected to said means and arranged to disconnect said system from the gun, and means in said control system including a potentiometer constructed and arranged to be moved by the follow-up motor for creating an electrical unbalance in the control system whereby the gun is moved to a predetermined position in elevation.

GEORGE W. PONTIUS, III.
ARTHUR P. WILSON.

REFERENCES CITED

The following references are of record in the file of this patent:

UNITED STATES PATENTS

| Number | Name | Date |
|---|---|---|
| 1,862,918 | Barnes | June 14, 1932 |
| 2,284,611 | Barnhart | May 26, 1942 |
| 2,173,656 | Newell | Sept. 19, 1939 |
| 2,047,727 | Dueringer | July 14, 1926 |
| 2,065,952 | Trautmann | Dec. 29, 1936 |
| 2,153,516 | Eck | Apr. 4, 1939 |
| 1,481,248 | Sperry | Jan. 15, 1924 |
| 1,724,093 | Kauch et al. | Aug. 13, 1929 |
| 1,939,517 | Paulus et al. | Dec. 12, 1933 |
| 1,474,745 | Walker et al. | Nov. 20, 1923 |
| 1,829,181 | Bates | Oct. 27, 1931 |
| 1,919,191 | Bates | July 25, 1933 |
| 2,160,202 | Fieux | May 30, 1939 |
| 2,190,569 | Macgill | Feb. 13, 1940 |

FOREIGN PATENTS

| Number | Country | Date |
|---|---|---|
| 127,026 | Great Britain | May 29, 1919 |
| 800,484 | France | May 4, 1936 |
| 817,228 | France | May 24, 1937 |